US012300867B2

(12) United States Patent
Li

(10) Patent No.: US 12,300,867 B2
(45) Date of Patent: May 13, 2025

(54) DIELECTRIC FILTER

(71) Applicant: Telefonaktiebolaget LM Ericsson (publ), Stockholm (SE)

(72) Inventor: Jingpeng Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 18/254,452

(22) PCT Filed: Sep. 15, 2021

(86) PCT No.: PCT/CN2021/118484
§ 371 (c)(1),
(2) Date: May 25, 2023

(87) PCT Pub. No.: WO2022/110987
PCT Pub. Date: Jun. 2, 2022

(65) Prior Publication Data
US 2024/0006732 A1 Jan. 4, 2024

(30) Foreign Application Priority Data
Nov. 27, 2020 (CN) ......................... 202022806470.0

(51) Int. Cl.
*H01P 1/20* (2006.01)
*H01P 1/213* (2006.01)
*H01P 7/10* (2006.01)

(52) U.S. Cl.
CPC ............ *H01P 1/2002* (2013.01); *H01P 1/213* (2013.01); *H01P 7/105* (2013.01)

(58) Field of Classification Search
CPC .......... H01P 1/2002; H01P 1/20; H01P 1/201; H01P 1/208; H01P 1/2088; H01P 1/202; H01P 1/205; H01P 1/2053; H01P 1/2056; H01P 3/16
See application file for complete search history.

(56) References Cited

U.S. PATENT DOCUMENTS 7,956,708 B2 6/2011 Bates et al.
2005/0270125 A1 12/2005 Higgins et al.
2008/0231391 A1 9/2008 Takubo et al.

FOREIGN PATENT DOCUMENTS

CN 109155450 A 1/2019
CN 110265753 A 9/2019
CN 110504512 A 11/2019
(Continued)

*Primary Examiner* — Stephen E. Jones
(74) *Attorney, Agent, or Firm* — Murphy, Bilak & Homiller, PLLC

(57) ABSTRACT

Disclosed is a dielectric filter. The dielectric filter includes a body; at least one dual mode resonant unit and at least one single mode resonant unit arranged in the body; and a groove structure formed in the body and configured to partially separate the at least one single mode resonant unit and the at least one dual mode resonant unit adjacent thereto. Each dual mode resonant unit at least has a first frequency resonant hole and a second frequency resonant hole. Each single mode resonant unit has a third frequency resonant hole. The first frequency resonant hole has a first longitudinal extension line perpendicular to a second longitudinal extension line of the second frequency resonant hole. The third frequency resonant hole has a third longitudinal extension line parallel to the first longitudinal extension line.

14 Claims, 5 Drawing Sheets

(56) References Cited

FOREIGN PATENT DOCUMENTS

| | | | |
|---|---|---|---|
| CN | 110896163 | A | 3/2020 |
| CN | 110911787 | A | 3/2020 |
| CN | 111106419 | A | 5/2020 |
| CN | 210468051 | U | 5/2020 |
| CN | 210628457 | U | 5/2020 |
| CN | 111384495 | A | 7/2020 |
| CN | 111740193 | A | 10/2020 |
| CN | 111916880 | A | 11/2020 |
| CN | 111987394 | A | 11/2020 |
| CN | 211879571 | U | 11/2020 |
| EP | 0855757 | B1 | 12/2003 |
| EP | 2062366 | B1 | 8/2013 |
| EP | 3742543 | A1 | 11/2020 |
| KR | 20200086219 | A | 7/2020 |

DIELECTRIC FILTER

CROSS-REFERENCE TO RELATED APPLICATION

This application claims the benefit of Chinese Patent Application No. 202022806470.0, filed with China National Intellectual Property Administration on Nov. 27, 2020, the whole disclosures of which is incorporated herein by reference.

TECHNICAL FIELD

The present disclosure generally relates to the field of telecommunications technology, and in particular, to a dielectric filter.

BACKGROUND

This section is intended to provide background or context for specific embodiments of the present disclosure described in claims. The description herein may include concepts which are intended to be claimed and may be concepts that have not been conceived, implemented or described previously. Therefore, the content described in this section should not be considered as the related art to the description and claims of the present disclosure although it is included in this section, unless otherwise stated.

Base station is an important part of a mobile communication system, and typically includes a BU (Baseband Unit), a RU (Radio Unit) and an antenna. In a typical base station, a RRU (Remote Radio unit) and an AU (Antenna Unit) are two independently separated units and are hung on high construction. Considering installation, fixation, occupation and other factors, it is desirable that the base station has smaller volume and lighter weight during designing the base station.

In recent years, with the development of the mobile communication system, demands for the radio unit of small size and high performance are growing rapidly. The current advance radio unit is required to be miniaturized in a whole unit size as much as possible, and a filter used with the radio unit is accordingly also required to have an increasingly small size.

Currently, a miniaturized filter includes a body made by a solid dielectric material and a plurality of resonators formed by metalizing, for example by plating silver, a surface of the body. Each of the resonators generates a resonant frequency at an operating pass band. The resonators and a coupling between the resonators form a waveguide filter.

Current advance radio requires to miniaturize the whole radio size as much as possible. If only reducing the size of filter that will decrease the performance such as insertion loss or out of band attenuation. A way to reduce the filter's size while maintaining its highly performance is to utilize dual modes per resonating cavity.

Similar with metal filter, the dielectric filter needs to use main coupling and cross coupling to implement high selectivity of the filter. Capacitive cross coupling and inductive cross coupling are needed to achieve the high selectivity requirement on both upper side and the lower side of the pass band. By using capacitive coupling, a transmission zero is formed at the lower side of the passband. By using inductive coupling, a transmission zero is formed at the upper side of the passband.

At present, in a dual mode dielectric filter commonly used cut corner or used tuning hole on a chamber surface to implement the main coupling of one dual mode resonator. This solution is difficult for production.

Furthermore, in a dielectric filter commonly used in the industry, two transmission zero both beyond the passband and below the passband of the dielectric filter usually can be implemented by capacitive coupling. But to implement capacitive coupling of the dielectric filter is very difficult, an additional structure such as a PCB or plating pattern, or deeply blind hole needs to be used and may cause spurious issue at the low side of pass band.

SUMMARY

In view of the above, embodiments of the present disclosure is to provide a dielectric filter in order to overcome at least one aspect of the above-mentioned and other disadvantages and defects in the related art.

According to one aspect of the present disclosure, there is provided a dielectric filter, including:

- a body;
- at least one dual mode resonant unit arranged in the body, each dual mode resonant unit at least having a first frequency resonant hole and a second frequency resonant hole;
- at least one single mode resonant unit arranged in the body and adjacent to the at least one dual mode resonant unit, each single mode resonant unit having a third frequency resonant hole; and
- a groove structure formed in the body and configured to partially separate the at least one single mode resonant unit and the at least one dual mode resonant unit adjacent thereto;
- wherein the first frequency resonant hole and the second frequency resonant hole are located on different surfaces of the body, and the first frequency resonant hole has a first longitudinal extension line perpendicular to a second longitudinal extension line of the second frequency resonant hole;
- wherein the third frequency resonant hole is located on surface of the body, and the third frequency resonant hole has a third longitudinal extension line parallel to the first longitudinal extension line;
- wherein an orthogonal projection of the second frequency resonant hole onto a plane perpendicular to the first longitudinal extension line is located between an orthogonal projection of the first frequency resonant hole onto the plane and an orthogonal projection of the third frequency resonant hole onto the plane.

In some embodiments of the present disclosure, the third frequency resonant hole and the first frequency resonant hole are located on two opposite surfaces of the body, respectively.

In some embodiments of the present disclosure, the third frequency resonant hole and the first frequency resonant hole are located on a same surface of the body.

In some embodiments of the present disclosure, the dielectric filter can further includes: one or more coupling adjustment hole located on a surface of the body opposite to the surface where the first frequency resonant hole is located, and each coupling adjustment hole has a depth less than that of any one of the first frequency resonant hole and the second frequency resonant hole.

In some embodiments of the present disclosure, the coupling adjustment hole is located within each dual mode resonant unit.

In some embodiments of the present disclosure, the coupling adjustment hole is located between each dual mode resonant unit and the single mode resonant unit adjacent thereto.

In some embodiments of the present disclosure, the at least one dual mode resonant unit includes two or more dual mode resonant units and the at least one single mode resonant unit includes two or more single mode resonant units.

In some embodiments of the present disclosure, when viewed from the plane perpendicular to the first longitudinal extension line, the groove structure further includes a longer groove portion and shorter groove portions crossing the longer groove portion, wherein the longer groove portion is further formed to at least separate any two adjacent ones of the two or more single mode resonant units, and the shorter groove portions are further formed to partially separate any two adjacent ones of the two or more dual mode resonant units.

In some embodiments of the present disclosure, the groove structure is configured as a through groove extending between two opposite surfaces of the body.

In some embodiments of the present disclosure, at least one of the first frequency resonant hole, the second frequency resonant hole and the third frequency resonant hole is a blind hole or a through hole.

In some embodiments of the present disclosure, the dielectric filter can further includes: a conductive layer, configured to cover all surfaces of the body and at least partially cover each of the first frequency resonant hole, the second frequency resonant hole and the third frequency resonant hole.

In some embodiments of the present disclosure, at least one of the first frequency resonant hole, the second frequency resonant hole and the third frequency resonant hole is a through hole with a step, and at least a portion of the step is not coated with the conductive layer.

In some embodiments of the present disclosure, the body is made of a dielectric material.

In some embodiments of the present disclosure, at least one of the first frequency resonant hole, the second frequency resonant hole and the third frequency resonant hole has a cross section in a rectangular, circular, oval or polygonal shape.

The dielectric filter according to the present disclosure achieves at least one of the following advantages and/or benefits. The dielectric filter according to the present disclosure minimizes its structure while simplifying the manufacturing process. The dielectric filter according to the present disclosure also reduces radio size and weight, simplifies the design, make the design flexible, and improves the production efficiency. The dielectric filter according to the present disclosure further improves the radio performance and saves its cost.

BRIEF DESCRIPTION OF THE DRAWINGS

Accompanying drawings of embodiments of the present disclosure will be briefly described below in order to more clearly describe technical solutions of the embodiments of the present disclosure. It should be understood that the accompanying drawings described below only refer to some embodiments of the present disclosure, rather than limiting the present disclosure, in which.

DETAILED DESCRIPTION

In order to more clearly illustrate objectives, technical solutions, and advantages of the present disclosure, embodiments of the present disclosure will be described in detail below with reference to the accompanying drawings. It should be understood that the following description of the embodiments is intended to explain and illustrate general idea of the present disclosure, and should not be construed as a limitation to the present disclosure. In the description and the accompanying drawings, same or similar reference signs refer to same or similar elements or components. For sake of clarity, the drawings are not necessarily drawn to scale, and some well-known components and structures may be omitted from the drawings.

The technical or scientific terms used herein shall have common meanings understood by those ordinary skilled in the art, unless otherwise stated. The words "first", "second" and similar words used herein are merely intended to distinguish different elements or components, rather than indicating any order, quantity or importance. The word "a" or "an" does not exclude a plurality. The word "include", "include" or other similar words means that an element or item appearing before the word covers an element or item listed and their equivalents after the word, but does not exclude other elements or items. The word "connect", "connection" or other similar words are not limited to physical or mechanical connections, and may include direct or indirect electrical connection. The word "up", "down", "left", "right", "top" or "bottom" is merely used to indicate the relative position relationship. When an absolute position of a described object is changed, its relative position relationship may also be accordingly changed. When an element such as a layer, a film, a region, or a substrate is described as "on" or "under" another element, the element may be "directly" "on" or "under" the another element, or there may be an intermediate element.

Figure 1:
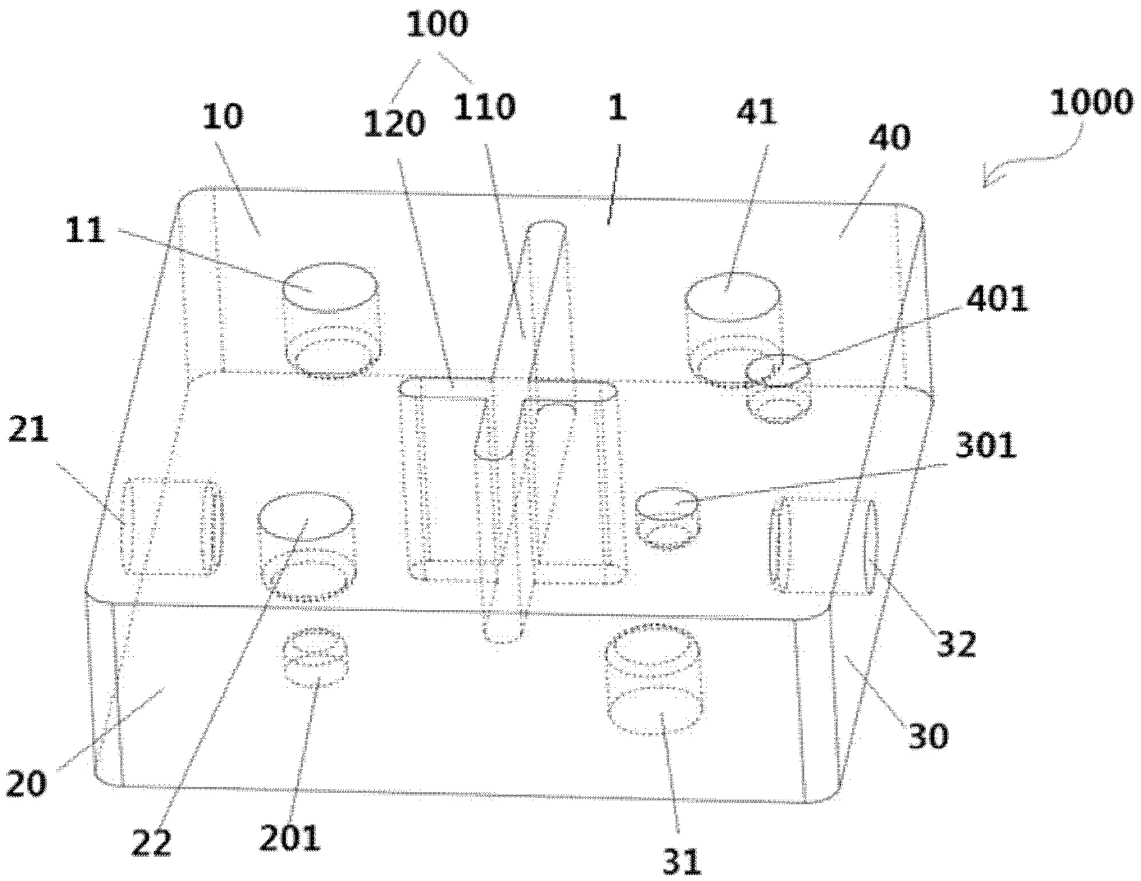
FIG. 1 shows a perspective view of a dielectric filter according to an exemplary embodiment of the present disclosure.

Referring to FIG. 1, a dielectric filter 1000 according to an exemplary embodiment of the present disclosure is shown. Specifically, the dielectric filter 1000 generally includes a body 1, a plurality of resonant units 10, 20, 30, 40 arranged in the body 1, and a groove structure 100 formed in the body 1. Of course, the dielectric filter 1000 may also include other known components which are necessary to realize functions as desired, the detailed description of which will be omitted herein.

The body 1 may be made of a solid dielectric material that may be any possible dielectric material known in the art. The body 1 may have a cuboid or cube shape. Alternatively, the body 1 may also have other shapes. Note that FIG. 1 shows that corners of the body 1 are cut to prevent the body from being damaged.

According to the present disclosure, the dielectric filter 1000 may be a mix mode dielectric filter including at least one dual mode resonant unit and at least one single mode resonant unit. For example, in the exemplary embodiment of FIG. 1, the dielectric filter 1000 includes first and second dual mode resonant units 20, 30 and first and second single mode resonant units 10, 40. In another exemplary embodiment, the dielectric filter 1000 may include first single mode resonant unit 10 and first dual mode resonant unit 20. That is, according to the present disclosure, one dual mode resonant unit and one single mode resonant unit adjacent to the one dual mode resonant unit constitute a basic group of resonant units.

Figure 2:
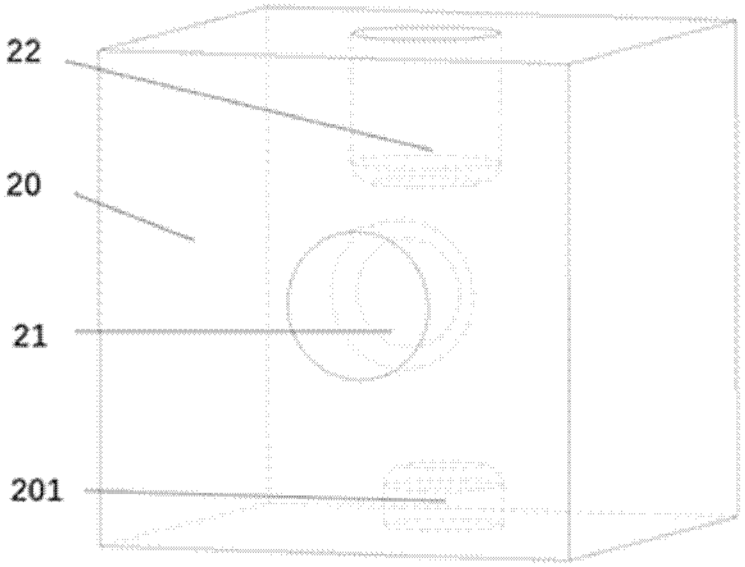
FIG. 2 shows a perspective view of one dual mode resonant unit of the dielectric filter according to an exemplary embodiment of the present disclosure.

Referring to FIG. 2, one dual mode resonant unit (here the first dual mode resonant unit 20 shown in FIG. 1 is taken as an example) is illustrated. As shown in FIG. 2, the dual mode resonant unit 20 at least includes a first frequency resonant hole 22 and a second frequency resonant hole 21. The first frequency resonant hole 22 and the second frequency resonant hole 21 are located on different surfaces of the body 1, and the first frequency resonant hole 22 has a first longitudinal extension line perpendicular to a second longitudinal extension line of the second frequency resonant hole 21. Provided that the body 1 has a generally cuboid or cube shape, surface of the body 1 where the first frequency resonant hole 22 is located and surface of the body 1 where the second frequency resonant hole 21 is located perpendicular to and adjacent to each other. For example, as shown in FIG. 2, the first frequency resonant hole 22 is formed on an upper surface of the body 1, and the first longitudinal extension line thus is a normal line of the upper surface of the body 1. Further, the second frequency resonant hole 21 is formed on a front surface of the body 1, and the second longitudinal extension line thus is a normal line of the front surface of the body 1.

In addition, as shown in FIG. 2, the dual mode resonant unit 20 further includes an coupling adjustment hole 201 located on a surface of the body 1 opposite to the surface where the first frequency resonant hole 22 is located. Of course, as an alternative, the coupling adjustment hole 201 can be located on a surface of the body 1 opposite to the surface where the second frequency resonant hole 21 is located. That is to say, the coupling adjustment hole 201 is designed to be located on a surface of the body opposite to the surface where one frequency resonant hole is located. In other words, the coupling adjustment hole 201 is located on another surface of the body 1 except for the surfaces on which the first frequency resonant hole 22 and the second frequency resonant hole 21 are located, while the coupling adjustment hole 201 has a longitudinal extension line parallel to the first longitudinal extension line or the second longitudinal extension line. Here, the coupling adjustment hole 201 has a depth less than that of any one of the first frequency resonant hole 22 and the second frequency resonant hole 21. In other words, each of the first frequency resonant hole 22 and the second frequency resonant hole 21 has a relatively long longitudinal extension length greater than a longitudinal extension length of the coupling adjustment hole 201. That is, each of the first frequency resonant hole 22 and the second frequency resonant hole 21 has a depth greater than that of the coupling adjustment hole 201.

According to the present disclosure, in some embodiments where there are two or more dual mode resonant units arranged in the body, these dual mode resonant units are substantially same in structure, and the difference therebetween is only in position, size and shape of the first frequency resonant hole, the second frequency resonant hole, and the coupling adjustment hole.

Figure 3:
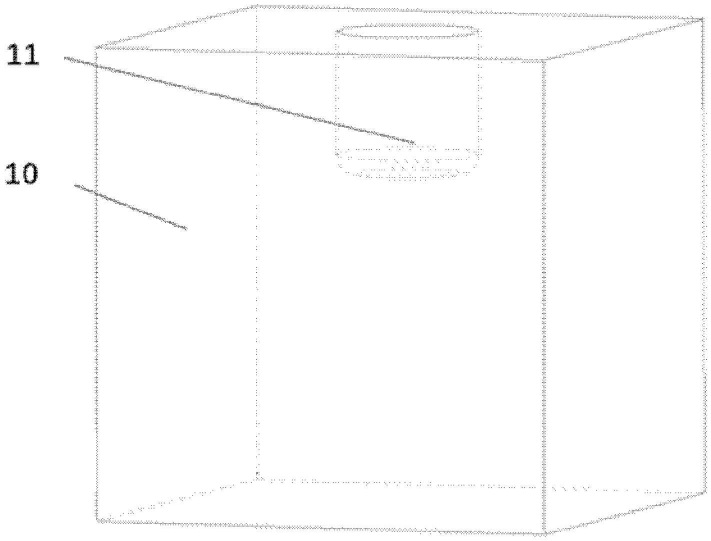
FIG. 3 shows a perspective view of one single mode resonant unit of the dielectric filter according to an exemplary embodiment of the present disclosure.

Referring to FIG. 3, one single mode resonant unit (here the first single mode resonant unit 10 shown in FIG. 1 is taken as an example) is illustrated. As shown in FIG. 3, the single mode resonant unit 10 includes a third frequency resonant hole 11 having a third longitudinal extension line. The third longitudinal extension line of the third frequency resonant hole 11 is designed to be parallel to the first longitudinal extension line of the first frequency resonant hole 22 or the second longitudinal extension line of the second frequency resonant hole 21, which will be described in details hereinafter.

According to the present disclosure, in some embodiments where there are two or more single mode resonant units arranged in the body, these single mode resonant units are substantially same in structure, and the difference therebetween is only in position, size and shape of the third frequency resonant hole.

As being described above, according to the present disclosure, the dielectric filter 1000 is a mix mode dielectric filter including at least one abovementioned dual mode resonant unit and at least one abovementioned single mode resonant unit. The groove structure is configured to partially separate the at least one single mode resonant unit and the at least one dual mode resonant unit adjacent thereto. According to the present disclosure, an orthogonal projection of the second frequency resonant hole of the dual mode resonant unit onto a plane perpendicular to the first longitudinal extension line of the dual mode resonant unit is located between an orthogonal projection of the first frequency resonant hole of the dual mode resonant unit onto the plane and an orthogonal projection of the third frequency resonant hole of the single mode resonant unit onto the plane.

According to the present disclosure, in case that the third frequency resonant hole of the single mode resonant unit and the first frequency resonant hole of the dual mode resonant unit are located on two opposite surfaces of the body, respectively, transmission zero at lower passband is realized. In case that the third frequency resonant hole of the single mode resonant unit and the first frequency resonant hole of the dual mode resonant unit are located on the same surface of the body, transmission zero at higher passband is realized.

Provided that there are two or more dual mode resonant units and two or more single mode resonant units included in the dielectric filter, one dual mode resonant unit and one single mode resonant unit adjacent to the one dual mode resonant unit constitute a basic group of resonant units, and two or more basic groups of resonant units are included in the dielectric filter. In term of arrangement of these basic groups of resonant units, one basic group of resonant units is arranged to be adjacent to another basic group of resonant units; in other words, the dual mode resonant units and the single mode resonant units are arranged in an alternate manner.

Referring back to FIG. 1, in the exemplary embodiment, the dielectric filter 1000 includes two dual mode resonant units (namely, the first dual mode resonant unit 20 and the second dual mode resonant unit 30 as shown) and two single mode resonant unit 10, 40 (namely, the first single mode resonant unit 10 and the second single mode resonant unit 40 as shown). The first dual mode resonant unit 20 and the first single mode resonant unit 10 may be regarded as a first basic group of resonant units, and the second dual mode resonant unit 30 and the second single mode resonant unit 40 may be regarded as a second basic group of resonant units adjacent to the first basic group of resonant units. As shown in FIG. 1, the third frequency resonant hole 11 of the single mode resonant unit 10 and the first frequency resonant hole 22 of the dual mode resonant unit 20 are located on the same surface (namely an upper surface as shown) of the body 1, so transmission zero at higher passband is realized at the first basic group of resonant units 10 and 20; at the same time, the third frequency resonant hole 41 of the single mode resonant unit 40 and the first frequency resonant hole 31 of the dual mode resonant unit 30 are located on two opposite surfaces (namely the upper surface and a lower surface as shown) of the body 1, respectively, so transmission zero at lower passband is realized at the second basic group of resonant units 30 and 40.

According to the present disclosure, provided that there are two or more dual mode resonant units and/or two or more single mode resonant units included in the dielectric filter, the groove structure formed in the body is configured to at least partially separate two adjacent ones of two or more dual mode resonant units, two adjacent ones of two or more single mode resonant units, and any dual mode resonant unit and the single mode resonant unit adjacent thereto, respectively. That is to say, the groove structure formed in the body is configured to at least partially separate any two adjacent ones of the resonant units, regardless of single mode or dual mode. In other words, the groove structure formed in the body is configured to at least partially separate one resonant unit from the rest of the resonant units adjacent thereto.

According to the exemplary embodiment of the present disclosure, as shown in FIG. 1, the groove structure 100 is disposed at a middle position of the body 1. The groove structure 100 is configured to partially divide the body 1. For example, the groove structure 100 is configured as a through groove extending between two opposite surfaces (namely upper and lower surfaces as shown) of the body 1. However, the groove structure 100 is configured not to completely divide the body 1 into two or more parts completely separated from each other.

According to the exemplary embodiment of the present disclosure, as shown in FIG. 1, when viewed from the plane perpendicular to the first longitudinal extension line of the first frequency resonant hole 22, the groove structure 100 further includes a longer groove portion 110 and shorter groove portions 120 crossing the longer groove portion 110. The longer groove portion 110 is further formed to at least partially separate two adjacent single mode resonant units 10 and 40. As an example, in the exemplary embodiment of FIG. 1, the longer groove portion 110 is further formed to separate two adjacent single mode resonant units 10 and 40. In an alternative embodiment not shown, as another example, the longer groove portion 110 may be further formed to completely separate two adjacent single mode resonant units 10 and 40 by running through a common side shared by the two adjacent single mode resonant units 10 and 40; that is to say, the two adjacent single mode resonant units 10 and 40 are cut off from each other by the longer groove portion 110 and thus are not connected with each other. Moreover, in the exemplary embodiment of FIG. 1, the shorter groove portions 120 are further formed to partially separate the first single mode resonant unit 10 and the first dual mode resonant unit 20 adjacent thereto, and the second single mode resonant unit 40 and the second dual mode resonant unit 30 adjacent thereto, respectively. In addition, in the exemplary embodiment of FIG. 1, two adjacent dual mode resonant units 20 and 30 are also partially separated by the longer groove portion 110. In other words, in the exemplary embodiment of FIG. 1, the longer groove portion 110 is provided to separate the first basic group of the resonant units 10 and 20 which provides transmission zero at higher passband from the second basic group consisted of the resonant units 30 and 40 which provides transmission zero at lower passband, while the shorter groove portions 120 is provided to separate the single mode resonant unit from the dual mode resonant unit in each basic group of resonant units. In an alternative embodiment not shown, the groove structures 100 may include several separated pairs of the longer groove portions 110 and the shorter groove portions 120, and each pair of the longer groove portion 110 and the shorter groove portion 120 is configured to at least partially separate one resonant unit from other resonant units adjacent thereto. However, structural configuration of the groove structure 100 varies as desired, as long as these resonant units separated by the groove structure 100 are always connected to each other by a portion of the body 1, for example, the longer groove portion 110 will not separate, at one end of the body 1, the first dual mode resonant unit 20 and the second dual mode resonant unit 30 from each other, although the longer groove portion 110 is formed to partially separate one basic group of resonant units 10 and 20 which provides transmission zero at higher passband and one basic group of resonant units 30 and 40 which provides transmission zero at lower passband.

According to the present disclosure, the dielectric filter further includes one or more coupling adjustment hole located on a surface of the body opposite to the surface where the first frequency resonant hole is located. With continued reference to FIG. 1, in the first dual mode resonant unit 20, a coupling adjustment hole 201 is formed in the lower surface of the body 1 opposite to the upper surface where the first frequency resonant hole 22 is located; and in the second dual mode resonant unit 30, a coupling adjustment hole 301 is formed in the upper surface of the body 1 opposite to the lower surface where the first frequency resonant hole 31 is located. In other words, the coupling adjustment hole can be located within each dual mode resonant unit. Taking the first dual mode resonant unit 20 as an example, in the first dual mode resonant unit 20, the coupling adjustment hole 201 has a longitudinal extension line parallel to the first longitudinal extension line of the first frequency resonant hole 22. Specifically, as shown, the coupling adjustment hole 201 is formed on a lower surface of the body 1. In this case, the longitudinal extension line of the coupling adjustment hole 201 is a normal line of the lower surface, and the longitudinal extension line of the coupling adjustment hole 201 is obviously parallel to the first longitudinal extension line of the first frequency resonant hole 22.

Optionally, one or more additional coupling adjustment hole may be located between each dual mode resonant unit and the single mode resonant unit adjacent thereto. With continued reference to FIG. 1, in this exemplary embodiment, specifically, an additional coupling adjustment hole 401 is located between the second dual mode resonant unit 30 and the second single mode resonant unit 40 adjacent thereto. More specifically, an orthogonal projection of the coupling adjustment hole 401 onto a plane perpendicular to the first longitudinal extension line of the first frequency resonant hole 31 is located between an orthogonal projection of the second frequency resonant hole 32 onto the plane and an orthogonal projection of the third frequency resonant hole 41 onto the plane. In addition, in the exemplary embodiment shown, the coupling adjustment hole 401 is provided in the surface where the third frequency resonant hole 41 is located, however, in an alternative embodiment not shown, the coupling adjustment hole 401 may be provided in the surface where the second frequency resonant hole 32 is located.

According to the present disclosure, each coupling adjustment hole has a depth less than that of any one of the first frequency resonant hole and the second frequency resonant hole. As shown in FIG. 1, taking the first dual mode resonant unit 20 as an example, in the first dual mode resonant unit 20, each of the first frequency resonant hole 22 and the second frequency resonant hole 21 has a relatively long longitudinal extension length greater than a longitudinal extension length of the coupling adjustment hole 201. That is, each of the first frequency resonant hole 22 and the second frequency resonant hole 21 has a depth greater than that of the coupling adjustment hole 201. It should be noted that the depths of the first frequency resonant hole 22 and the second frequency resonant hole 21 may be set as desired. As an example, the depths of the first frequency resonant hole 22 and the second frequency resonant hole 21 may be set substantially same as each other. As another example, the depths of the first frequency resonant hole 22 and the second frequency resonant hole 21 may be set different from each other.

FIG. 1 in conjunction with FIG. 2 and FIG. 3 only shows an exemplary embodiment of the present disclosure by way of illustration. Of course, those skilled in the art may also conceive other possible equivalent modifications based on the above-described exemplary embodiment of the present disclosure.

Figure 4A:
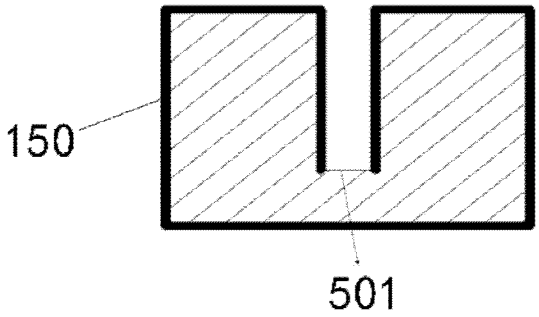
FIG. 4A shows a cross-sectional view of one frequency resonant hole shown in FIG. 1.

As shown in FIG. 4A, an example is shown in which any one of the first frequency resonant holes 22 and 31, the second frequency resonant holes 21 and 32, the third frequency resonant holes 11 and 41, and the coupling adjustment holes 201 and 301 of the first, second, third and fourth resonant units 10, 20, 30, 40 according to the exemplary embodiment of the present disclosure shown in FIG. 1 may be provided as the form of a blind hole 501. A depth, a size and a shape of the blind hole 501 may be set as desired. The blind hole 501 is configured such that a conductive layer 150 would not be coated over an entire inner surface of the blind hole 501. That is, at least part of the inner surface of the blind hole 501 is not covered with the conductive layer 150. For example, a region which is not covered with the conductive layer 150 may be a bottom region of the inner surface of the blind hole 501. In addition, the conductive layer 150 may be configured to cover all surfaces of the body 1.

Figure 4B:
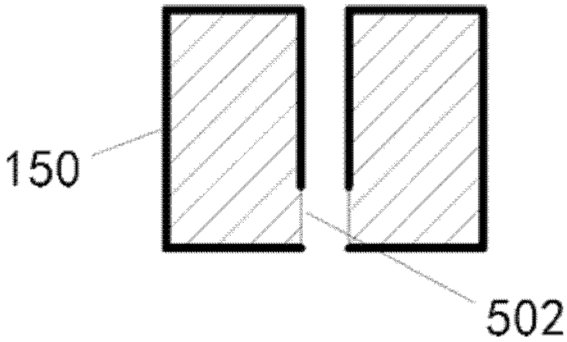
FIG. 4B shows a cross-sectional view of a modification of the frequency resonant hole shown in FIG. 1.
Figure 4C:
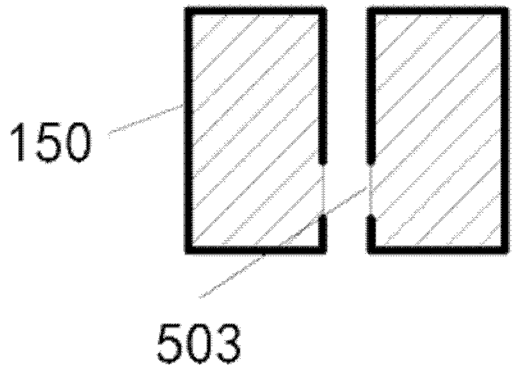
FIG. 4C shows a cross-sectional view of another modification of the frequency resonant hole shown in FIG. 1.

As shown in FIG. 4B, an example is shown in which any one of the first frequency resonant holes 22 and 31, the second frequency resonant holes 21 and 32, the third frequency resonant holes 11 and 41, and the coupling adjustment holes 201 and 301 of the first, second, third and fourth resonant unit 10, 20, 30, 40 according to the exemplary embodiment of the present disclosure shown in FIG. 1 may be provided in the form of a through hole 502. A depth, a size and a shape of the through hole 502 may be set as desired. The through hole 502 is configured such that the conductive layer 150 would not be coated over an entire inner surface of the through hole 502. That is, at least part of the inner surface of the through hole 502 is not covered with the conductive layer 150. For example, a region which is not covered with the conductive layer 150 may be a lower region of the inner surface of the through hole 502. Or else, the region which is not covered with the conductive layer 150 may be a middle region of the inner surface of the through hole 503, as shown in FIG. 4C. In addition, the conductive layer 150 may be configured to cover all surfaces of the body 1.

Figure 4D:
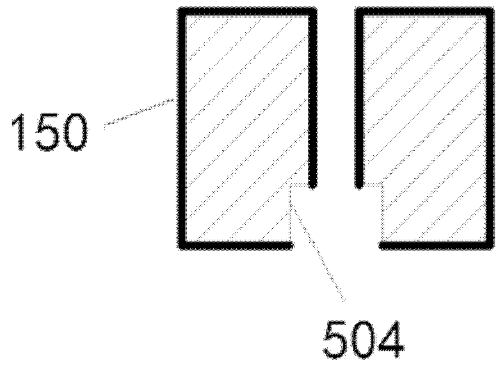
FIG. 4D shows a cross-sectional view of a further another modification of the frequency resonant hole shown in FIG. 1.

Alternatively, as shown in FIG. 4D, an example is shown in which any one of the first frequency resonant holes 22 and 31, the second frequency resonant holes 21 and 32, the third frequency resonant holes 11 and 41, and the coupling adjustment holes 201 and 301 of the first, second, third and fourth resonant unit 10, 20, 30, 40 according to the exemplary embodiment of the present disclosure shown in FIG. 1 may be provided in the form of a stepped through hole 504. A depth, a size and a shape of the stepped through hole 504 may be set as desired. A stepped region of the stepped through hole 504 is configured not to be covered with the conductive layer 150. In addition, the conductive layer 150 may be configured to cover all surfaces of the body 1.

Figure 5:
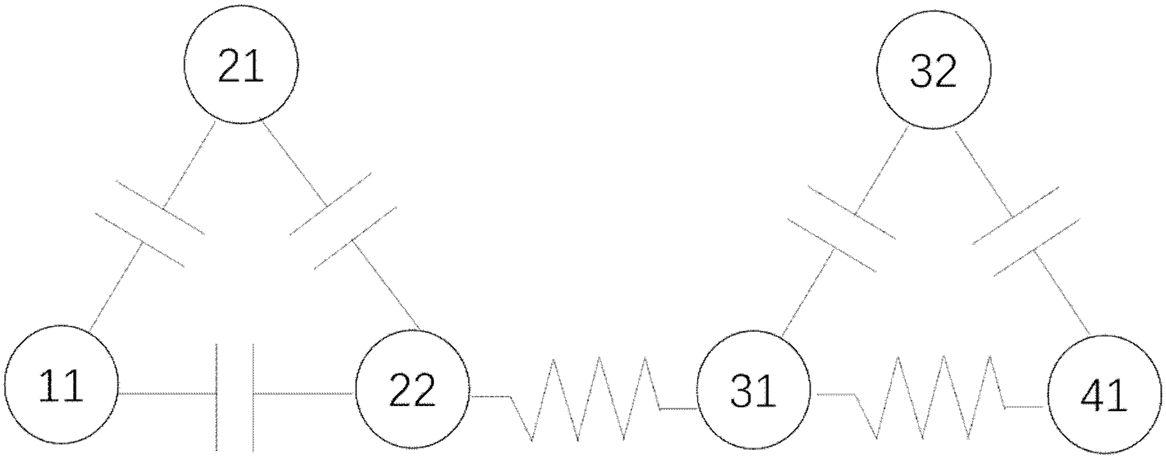
FIG. 5 shows a schematic topological view of the dielectric filter according to the exemplary embodiment of the present disclosure.

As shown in FIG. 5, a schematic topological view of the dielectric filter 1000 according to the present disclosure is illustrated. In FIG. 5, a topological structure of resonant frequency and coupling of the four resonant units of the dielectric filter 1000 is shown, which further illustrates that the dielectric filter 1000 according to the present disclosure can realize inductive and capacitive couplings.

Figure 6:
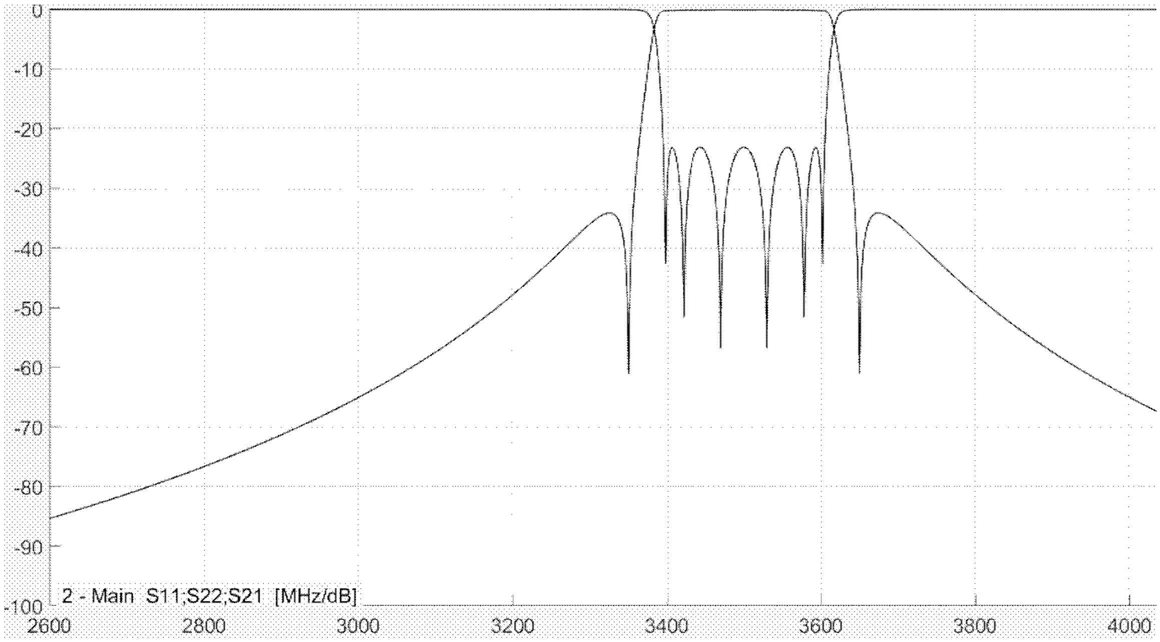
FIG. 6 shows an S parameter simulation view of the dielectric filter shown in FIG. 1 according to the present disclosure.

As shown in FIG. 6, an S parameter simulation result implemented by the dielectric filter 1000 shown in FIG. 1 is illustrated. Specifically, in a coordinate system shown in FIG. 6, the horizontal ordinate indicates Scanning Frequency (MHz) and the longitudinal coordinates indicates Amplitude (dB), two coupling transmission zeros are displayed at a high pass band and a low pass band, and no harmonic spikes appear in a low frequency band of the pass band.

In addition, it should be noted that in the illustrated embodiments of the present disclosure, a cross-section of each of the first frequency resonant hole, the second frequency resonant hole, the third frequency resonant hole and the coupling adjustment hole is shown in a circular shape. Alternatively, the cross-section may also be provided as various shapes such as a rectangular, oval, or polygonal shape, and it is not necessary to set the cross sections of the first frequency resonant hole, the second frequency resonant hole, the third frequency resonant hole and the coupling adjustment hole to be same with each other, and the shape of each of first frequency resonant hole, the second frequency resonant hole, the third frequency resonant hole and the coupling adjustment hole may be set as desired.

The above-mentioned embodiments merely exemplarily illustrate the principle and structure of the present disclosure, rather than being intended to limit the present disclosure. It should be understood by those skilled in the art that any changes and modifications made to the present disclosure without departing from the general concept of the present disclosure shall fall within the scope of the present disclosure. The scope of the present disclosure shall be defined by the claims of the present disclosure.

What is claimed is:

1. A dielectric filter, comprising:

a body;

at least one dual mode resonant unit arranged in the body, each dual mode resonant unit at least having a first frequency resonant hole and a second frequency resonant hole;

at least one single mode resonant unit arranged in the body and adjacent to the at least one dual mode resonant unit, each single mode resonant unit having a third frequency resonant hole; and a groove structure formed in the body and configured to partially separate the at least one single mode resonant unit and the at least one dual mode resonant unit adjacent thereto;

wherein the first frequency resonant hole and the second frequency resonant hole are located on different surfaces of the body, and the first frequency resonant hole has a first longitudinal extension line perpendicular to a second longitudinal extension line of the second frequency resonant hole;

wherein the third frequency resonant hole is located on a surface of the body, and the third frequency resonant hole has a third longitudinal extension line parallel to the first longitudinal extension line;

wherein an orthogonal projection of the second frequency resonant hole onto a plane perpendicular to the first longitudinal extension line is located between an orthogonal projection of the first frequency resonant hole onto the plane and an orthogonal projection of the third frequency resonant hole onto the plane.

2. The dielectric filter according to claim 1, wherein:

the third frequency resonant hole and the first frequency resonant hole are located on two opposite surfaces of the body, respectively.

3. The dielectric filter according to claim 1, wherein:

the third frequency resonant hole and the first frequency resonant hole are located on a same surface of the body.

4. The dielectric filter according to claim 1, wherein:

at least one of the first frequency resonant hole, the second frequency resonant hole and the third frequency resonant hole is a blind hole or a through hole.

5. The dielectric filter according to claim 1, wherein:

the body is made of a dielectric material.

6. The dielectric filter according to claim 1, wherein:

at least one of the first frequency resonant hole, the second frequency resonant hole and the third frequency resonant hole has a cross section in a rectangular, circular, oval or polygonal shape.

7. The dielectric filter according to claim 1, further comprising:

one or more coupling adjustment holes located on a surface of the body opposite to the surface where the first frequency resonant hole is located, and each coupling adjustment hole has a depth less than that of any one of the first frequency resonant hole and the second frequency resonant hole.

8. The dielectric filter according to claim 7, wherein:

the coupling adjustment hole is located within each dual mode resonant unit.

9. The dielectric filter according to claim 7, wherein:

the coupling adjustment hole is located between each dual mode resonant unit and the single mode resonant unit adjacent thereto.

10. The dielectric filter according to claim 1, wherein:

the at least one dual mode resonant unit comprises two or more dual mode resonant units and the at least one single mode resonant unit comprises two or more single mode resonant units.

11. The dielectric filter according to claim 10, wherein:

when viewed from the plane perpendicular to the first longitudinal extension line, the groove structure further comprises a longer groove portion and shorter groove portions crossing the longer groove portion, and wherein the longer groove portion is further formed to at least separate any two adjacent ones of the two or more single mode resonant units, and the shorter groove portions are further formed to partially separate any two adjacent ones of the two or more dual mode resonant units.

12. The dielectric filter according to claim 10, wherein:

the groove structure is configured as a through groove extending between two opposite surfaces of the body.

13. The dielectric filter according to claim 1, further comprising:

a conductive layer, configured to cover all surfaces of the body and at least partially cover each of the first frequency resonant hole, the second frequency resonant hole and the third frequency resonant hole.

14. The dielectric filter according to claim 13, wherein:

at least one of the first frequency resonant hole, the second frequency resonant hole and the third frequency resonant hole is a through hole with a step, and at least a portion of the step is not coated with the conductive layer.

* * * * *